United States Patent [19]

Chang et al.

[11] Patent Number: 5,433,934
[45] Date of Patent: Jul. 18, 1995

[54] METHOD FOR SIMULTANEOUS ABSORPTION OF SULFUR DIOXIDE AND NITRIC OXIDE FROM FLUE GAS

[75] Inventors: Dane Chang, Houston; Stephen A. Bedell; Larry H. Kirby, both of Lake Jackson, all of Tex.

[73] Assignee: The Dow Chemical Company, Midland, Mich.

[21] Appl. No.: 179,882

[22] Filed: Jan. 11, 1994

Related U.S. Application Data

[63] Continuation of Ser. No. 744,157, Aug. 13, 1991, abandoned.

[51] Int. Cl.[6] .................... B01D 53/60; B01D 53/50; B01D 53/56
[52] U.S. Cl. .................... 423/235; 423/242.6; 423/242.7; 423/243.07
[58] Field of Search ........... 423/242.7, 242.6, 242.3, 423/243.07, 235; 204/130

[56] References Cited

U.S. PATENT DOCUMENTS

| 3,733,780 | 5/1973 | Bellisio | 423/242.6 |
|---|---|---|---|
| 3,904,735 | 9/1975 | Atwood et al. | 423/243 |
| 4,013,430 | 3/1977 | Adachi et al. | 423/243 |
| 4,122,149 | 10/1978 | Dunnery et al. | 423/242.7 |
| 4,126,529 | 11/1978 | DeBerry | 204/182.4 |
| 4,331,639 | 5/1982 | Hass et al. | 423/235 |
| 4,347,227 | 8/1982 | Hass et al. | 423/235 |
| 4,421,733 | 12/1983 | Blytas | 423/226 |
| 4,436,714 | 3/1984 | Olson | 423/224 |
| 4,469,663 | 9/1984 | Crump et al. | 423/242 |
| 4,530,704 | 7/1985 | Jones et al. | 55/48 |
| 4,612,175 | 9/1986 | Harkness et al. | 423/235 |
| 4,615,780 | 10/1986 | Walker | 204/182.4 |
| 4,708,854 | 11/1987 | Grinstead | 423/235 |
| 4,732,744 | 3/1988 | Chang et al. | 423/235 |
| 4,783,327 | 11/1988 | Treybig et al. | 423/243 |
| 4,808,284 | 2/1989 | Bedell et al. | 204/130 |
| 4,820,391 | 4/1989 | Walker | 423/235 |
| 4,832,937 | 5/1989 | McIntyre et al. | 204/130 |
| 4,863,705 | 9/1989 | Epperly et al. | 423/235 |
| 5,019,365 | 5/1991 | Bedell | 423/243 |
| 5,077,023 | 12/1991 | Leutner et al. | 423/242 |
| 5,098,681 | 3/1992 | Christiansen et al. | 423/243 |
| 5,108,723 | 4/1992 | Chang et al. | 423/243 |
| 5,167,941 | 12/1992 | Bedell | 423/242.6 |

FOREIGN PATENT DOCUMENTS

| 368423 | 5/1990 | European Pat. Off. | 423/243 |
|---|---|---|---|
| 376485 | 7/1990 | European Pat. Off. | 423/242.6 |
| 51-14881 | 2/1976 | Japan | 423/242.3 |
| 1464050 | 2/1977 | United Kingdom . | |

*Primary Examiner*—Ferris Lander
*Assistant Examiner*—Peter DiMauro

[57] ABSTRACT

The simultaneous abatement of NO and $SO_2$ in flue gas is provided by an absorption process and apparatus utilizing an absorbent composition comprising an aqueous solution of chelates and sulfite salt for NO abatement and amine $SO_2$ absorbents such as piperazinones, morpholinones, piperidines, piperazines, piperazinediones, hydantoins, triazinones, pyrimidinones, oxazolidones, etc. for $SO_2$ abatement. $SO_2$ is thermally stripped from the spent absorbent and recovered. Metal chelates oxidized to an inactive state as a side-reaction are electrochemically reduced. An anionic exchange membrane in the electrochemical cell regenerates heat stable amine salt byproducts to be converted back to useable amine sorbent, and facilitates removal from the absorbent solution of other waste salts.

16 Claims, 1 Drawing Sheet

METHOD FOR SIMULTANEOUS ABSORPTION OF SULFUR DIOXIDE AND NITRIC OXIDE FROM FLUE GAS

CROSS REFERENCE TO RELATED APPLICATION

This is a continuation of application Ser. No. 07/744,157, filed Aug. 13, 1991, now abandoned.

FIELD OF THE INVENTION

The present invention relates to a process for the simultaneous absorption of sulfur dioxide and nitric oxide from flue or other combustion gases, more particularly the simultaneous absorption of sulfur dioxide ($SO_2$) and nitric oxide (NO) utilizing an aqueous solution of a heterocyclic amine, metal chelates and sulfites.

BACKGROUND OF THE INVENTION

Emissions control of sulfur dioxide and nitric oxide in flue gas streams resulting from the combustion of carbon-based fuels in power plants is an advancing art. There is a burgeoning need for an efficient and inexpensive process for abating such pollutant gases to meet ever increasing environmental concerns and the growing need to utilize plentiful, but pollutant-producing fuels, such as coal, to replace diminishing petroleum reserves.

In a widely employed practice, sulfur dioxide-containing flue gases are scrubbed with an aqueous lime or limestone slurry. Sulfur dioxide is removed by precipitation of hydrated $CaSO_4$ and $CaSO_3$ salts. A common variation of this process utilizes $SO_2$ sorbents such as sodium carbonates to produce a bisulfite intermediate. The sorbent may be subsequently regenerated by contacting the bisulfite with lime or limestone. The insoluble calcium salts produced thereby are typically disposed of in landfills.

Metal chelates, and ferrous chelates in particular, have been introduced to address the problem of NO abatement such as, for example, in U. S. Pat. Nos. 4,732,744 to Chang et al.; 4,612,175 to Harkness et al.; 4,708,854 to Grinstead; 4,615,780 to Walker; and 4,126,529 to DeBerry. In these references, $SO_2$ is scrubbed concurrently by a $SO_2$ sorbent such as water soluble sulfite, bisulfite and carbonate salts. The $SO_2$ is typically removed as a sulfite or sulfate waste stream such as, for example, in Chang by a crystallization separation process, in Walker and DeBerry by electrodialysis or in Grinstead by ultrafiltration or dialysis.

U.S. Pat. No. 4,347,227 to Hass et al. discloses an aqueous solution of formic or oxalic acid and an alkanolamine containing a tertiary amine group used to scrub $SO_2$ from the flue gas. The $SO_2$ may be recovered in an absorbent regeneration stage, but this process requires a 2-stage absorption step.

U. S. Pat. Nos. 4,783,327 to Treybig et al. and 4,530,708 to Jones et al. both disclose processes for selectively removing and recovering sulfur dioxide from a gas stream by absorbing the $SO_2$ in an aqueous solution containing piperazinones. However, neither process discloses chelates for NO abatement.

In commonly assigned application Ser. No. 569,117, filed Aug. 16, 1990, entitled "Process for Absorption of Sulfur Compounds from Fluids," (applicants Dane Chang and Steven H. Christiansen), there is disclosed a process wherein sulfur dioxide is removed from a fluid containing $SO_2$ by employing as an absorbent for the $SO_2$ an aqueous solution of a compound represented by the formula:

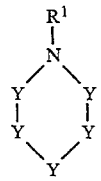

wherein each Y is independently —($CR^2_2$)—, —($CR^2_2$)= or —(C=O)— and each $R^1$ and $R^2$ is independently hydrogen, an alkyl group; a group; an aldehyde group; a carboxylic acid group or salt thereof; an alkyl group containing at least one carboxylic ester, a carboxylic acid or salt thereof, ether, aldehyde, ketone, or sulfoxide group; wherein the compound has at least one carbonyl group. Representative of such absorbents are 2-piperidone and ethyl piperidone 2-carboxylate.

In commonly assigned application Ser. No. 569,120, now U.S. Pat. No. 5,098,681, filed Aug. 16, 1990, entitled "Process for Absorption of Sulfur Compounds from Fluids" (applicants Steven H. Christiansen, Dane Chang and Druce K. Crump), there is described a process wherein sulfur dioxide is removed from a fluid containing $SO_2$ by employing as an absorbent therefor an aqueous solution of a compound represented by the formulae:

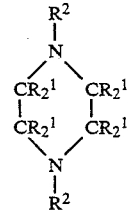

wherein each $R^1$ or $R^2$ is independently hydrogen; an alkyl group; a hydroxyalkyl group; an aldehyde group; a carboxylic acid or salt group; an alkyl group containing at least one carboxylic ester, carboxylic acid or salt, ether, aldehyde, ketone or sulfoxide; and wherein at least $R^1$ or $R^2$ is carbonyl-containing group, such as an aldehyde group, a carboxylic acid containing group, a carboxyl ester group, or a ketone-containing group; or $$\begin{array}{c} N \\ / \quad \backslash \\ CR_2^3 \quad C=O \\ | \quad\quad | \\ O=C \quad CR_2^3 \\ \backslash \quad / \\ N \end{array}$$

wherein each $R^3$ is independently hydrogen; an alkyl group; a hydroxyalkyl group; an aldehyde group; a carboxylic ester, a carboxylic acid or salt, ether, aldehyde, ketone or sulfoxide group. Representative of such absorbents are ethyl-1-piperazine carboxylate, 1,4-diformyl piperazine, 1-succinyl piperazine, glycine anhydride, and 1,4-dimethyl-2,5-piperazinedione.

In commonly assigned application Ser. No. 569,091, filed Aug. 16, 1990, entitled "Process for Absorption of Sulfur Compounds from Fluids" (applicants Steven H. Christiansen, Dane Chang and David A. Wilson), there is described a process wherein sulfur dioxide is removed from a fluid containing $SO_2$ by employing as an absorbent therefor an aqueous solution of compound represented by the formula:

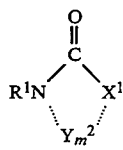

wherein X is —O—, —$NR^1$—, or —N=; each Y is independently —($CR^2_2$)—, —(C=O)—, —O—, $NR^1$—, —N=, or —$C(R^2)$=; each $R^1$ and $R^2$ is independently hydrogen; an alkyl group; a hydroxyalkyl group; an aldehyde group; a carboxylic acid or salt group; or an alkyl group containing an aldehyde group, a carboxylic acid or salt group, ketone, carboxylic ester, ether, or sulfoxide group; and m is an integer preferably of from 2 to about 4. Representative of such absorbents are hydantoin, , $N^2,N^3$-dimethylpropyleneurea, trialkyl-1,3,5-triazine-2,4,6(1H,3H,5H)-trione, and 2-oxazolidone.

In commonly assigned application Ser. No. 569,118, filed Aug. 16, 1990, entitled "Process for Absorption of Sulfur Compounds from Fluids" (applicants Dane Chang, Steven H. Christiansen and David A. Wilson), there is described a process for removing $SO_2$ from a fluid containing $SO_2$ by employing as an absorbent for the $SO_2$ an admixture of water and a compound represented by the formula:

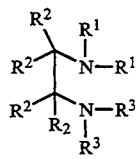

wherein each $R^1$, $R^2$ or $R^3$ is independently hydrogen; an alkyl group; a carboxylic acid group; a hydroxyalkyl group; an aldehyde group; or an alkyl group containing a carboxylic ester, a carboxylic acid or salt, ether, aldehyde, ketone or sulfoxide group; wherein at least one of $R^1$ and R'is a carboxymethyl group and at least one of $R^1$ and R'is hydrogen, preferably at least one $R^1$ is carboxymethyl and at least one R'is hydrogen. Representative of such absorbents is symmetrical ethylenediaminediacetic acid.

U.S. Pat. No. 4,863,705 to Epperly et al. describes the use of a 5 or 6 member heterocyclic hydrocarbon having at least 1 cyclic nitrogen as a treating agent for reducing the concentration of nitrogen oxides in a flue gas.

It is desirable that a process be devised for the efficient, simultaneous removal of $SO_2$ and NO from flue gas streams wherein $SO_2$ may be recovered, the absorbent may be regenerated, and heat stable salts may be maintained at acceptable concentrations, with minimum waste formation.

SUMMARY OF THE INVENTION

The present invention is based upon the discovery that aqueous solutions of amine-based $SO_2$ absorbent, metal chelate and sulfite under pH controlled conditions are compatible, and may be used to simultaneously, effectively absorb both $SO_2$ and NO from fluids. The $SO_2$ can be thermally stripped and recovered from the absorbent and any chelates oxidized to an inactive state can be reduced, for example, in an electrochemical cell. In addition, when an anionic exchange membrane is used in the cell, heat stable salts of the $SO_2$ absorbent can be converted back to free amine and soluble anions can be removed from the absorbent solution, enhancing absorption effectiveness.

In one embodiment, the present invention comprises a process for abating nitric oxide and sulfur dioxide from a flue gas. In one step, flue gas is contacted with an absorbent solution comprising a metal chelate, sulfite salt, and an amine $SO_2$ absorbent to simultaneously absorb sulfur dioxide and nitric oxide in the absorbent solution. In another step, the sulfur dioxide is thermally stripped from the absorbent. The process also includes regenerating oxidized metal chelates by reducing them to an active state. Regenerated absorbent solution is recycled to the contacting step.

In another embodiment of the present process, the stripped absorbent solution is directed to a cathode compartment of an electrochemical cell comprised of an anode in an anode compartment separated by a membrane from a cathode in the cathode compartment. An electrical potential is imposed across the anode and cathode to reduce inactive oxidized chelates to an active state. Preferably, an anionic exchange membrane is used. Heat stable salts are converted to free amine sorbent in the cathode compartment and soluble salt anions diffuse from the cathode compartment through the anion exchange membrane into the anode compartment, for example, heat stable piperazinone salts can be converted to free piperazinone sorbent therein. In a further step, regenerated absorbent solution from the cathode compartment is recycled to the flue gas contacting step. The process may further comprise the step of adjusting the pH of the regenerated recycle absorbent to from about 3 to about 8.

In another embodiment, there is provided a composition for simultaneous abating nitric oxide and sulfur dioxide from flue gas comprising an aqueous solution of metal chelate; a 5 to 7 member heterocyclic amine $SO_2$ absorbent; and a water soluble sulfite.

In another embodiment, there is provided a composition for simultaneous abating nitric oxide and sulfur dioxide from flue gas comprising an aqueous solution of metal chelate; an alkylene diamine $SO_2$ absorbent; and a water soluble sulfite.

In a further embodiment, there is provided an apparatus for simultaneous abating nitric oxide and sulfur dioxide from flue gases comprising an absorber column; an absorbent solution comprising an aqueous solution of metal chelate, a 5 to 7 member heterocyclic amine $SO_2$ absorbent, and a water soluble sulfite; a stripper column; and an electrochemical cell.

Still further, the present invention provides an apparatus for simultaneous abating nitric oxide and sulfur dioxide from flue gases comprising an absorber column; an absorbent solution comprising an aqueous solution of metal chelate, an alkylene diamine $SO_2$ absorbent, and a water soluble sulfite; a stripper column; and an electrochemical cell.

BRIEF DESCRIPTION OF THE DRAWING

The FIGURE represents a schematic diagram of a process used to simultaneously treat flue gases in accordance with the present invention.

A flue gas stream 12 enters an absorber column 10 in counter-current flow with an absorbent 11 at a temperature of from about 5° C. to about 80° C. and a pH of from about 3 to about 8. The stream 12 may be initially cooled (if necessary) to a temperature of from about 25° C. to about 60° C. in a contacting vessel 14 by a closed loop water quench comprising a pump 20 and cooler 18. A purified gas stream 24 exits the absorber 10 for venting into the atmosphere or directing to other processing units. The absorber column 10 may be packed with packing shapes, utilize a spray design or contain trays of appropriate spacing as is known in the art. A spent absorbent stream 26 (i.e. $SO_2$ rich) is pumped from absorber 10 by a pump 28 through a filter 30 wherein any accumulated particulate matter such as ash may be removed. After heating by a cross exchanger 36, a $SO_2$ rich stream 40 is fed to a stripper column 42 in counter-current flow. A portion of a lean $SO_2$ absorbent stream 58 is contacted with steam (100° C.) generated by a reboiler 66 and recycled to the stripper column 42. The stripper column 42 desorbs $SO_2$ regenerating the absorbent for $SO_2$ absorption. A stripper overhead stream 44 comprising $SO_2$ and steam is cooled by exchanger 46 to condense the steam. An essentially pure $SO_2$ stream 56 is separated from condensables in vessel 50 and a condensable stream 54 is refluxed into the stripper column 42. A portion of the lean $SO_2$ absorbent stream 58 taken off stripper column 42 at valve 60 is cooled to a temperature of from about 5° C. to about 80° C. in the cross exchanger 36 and a cooler 72 and pumped to an electrochemical cell 76, to further restore the absorbent for $SO_2$ and NO abatement. The electrochemical cell 76 has a cathode compartment 78 and an anode compartment 80 separated by an anion exchange membrane 79. In the cathode compartment 78, the absorbent stream is regenerated for NO absorption by a cathode reaction. In addition, a portion of a sorbent-based heat stable salt (HSS) present in the lean absorbent may be converted to free sorbent and a portion of soluble salt anions may be removed from the absorbent by electrodialytic diffusion across the anion exchange membrane 79 into the anode compartment 80. A closed loop comprised of a feed tank 86 and a pump 88 circulates electrolytic water through the anode compartment 80. If desired, a portion of the lean $SO_2$ absorbent may be supplied directly as absorbant 11 to the absorber 10 through bypass line 90 so that the electrochemical cell 76 operates on a side stream basis. The regenerated absorbent stream 11 has reduced heat stable salt and other byproduct salt concentration and is recirculated into contact with the flue gas 12 in the absorber column 10.

DETAILED DESCRIPTION OF THE INVENTION

Figure 1:
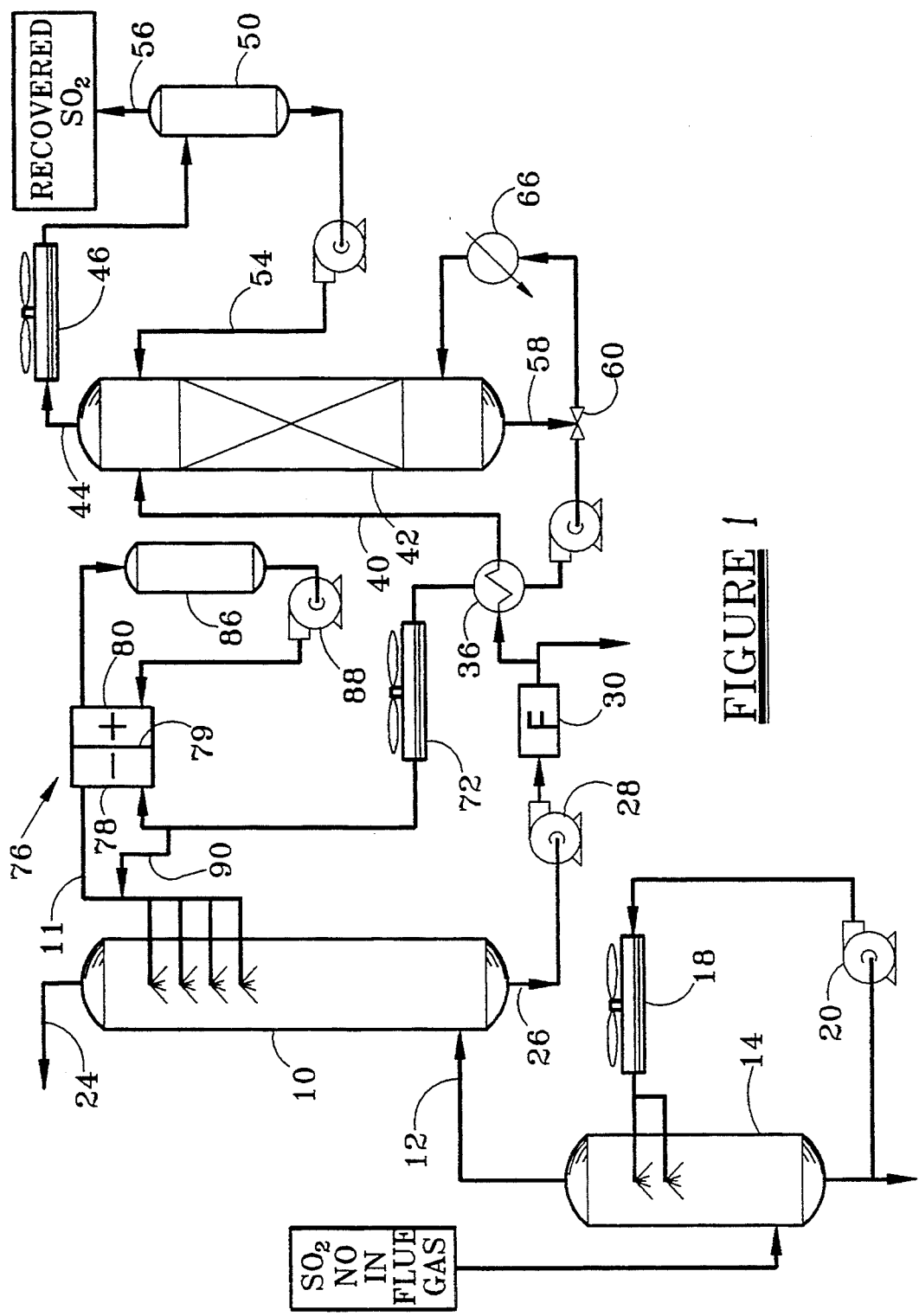

The process of the present invention provides for the simultaneous absorption of nitric oxide (NO) and sulfur dioxide ($SO_2$) from flue gases. It has been discovered that absorbents comprising an aqueous solution of an amine $SO_2$ absorbent, metal chelate and sulfites are compatible in an aqueous solution under pH controlled conditions, are thermally and electrochemically regenerable and have utility in the simultaneous NO and $SO_2$ absorption from flue gases.

A suitable metal chelate is typically prepared by admixing a water soluble active metal salt with a water-soluble chelating agent. Soluble active metal salts include salts such as sulfate, acetate, oxalate, and the like of a metal. Representative metal ions are chromium, cobalt, copper, iron, lead, manganese, mercury, molybdenum, nickel, palladium, platinum, tin, titanium, tungsten, and vanadium. Of these metals, iron, copper and nickel are preferred.

The term "chelating agent" is well known in the art and references are made thereto for the purposes of this invention. Chelating agents useful in the present invention include those chelating or complexing agents which form a water-soluble chelate with one or more of the afore-described metals. Representative of such chelating agents are the aminopolycarboxylic acids, including the salts thereof, nitrilotriacetic acid, N-hydroxyethylaminodiacetic acid and the polyaminocarboxylic acids including ethylenediaminetetraacetic acid, N-hydroxyethylene diaminetriacetic acid, diethylene triaminepentaacetic acid, cyclohexanediaminetetraacetic acid, triethylenetetraaminehexaacetic acid, and the like; aminophosphonic acids such as ethylenediamine tetra(methylenephosphonic acid), aminotri(methylenephosphonic acid), diethylenetriamine penta(methylenephosphonic acid); phosphonic acids such as 1-hydroxyethylidene-1,1-diphosphonic acid, 2-phosphonoethane-1,2-dicarboxylic acid; polyhydroxy chelating agents such as monosaccharides and sugars (e.g.,disaccharides such as sucrose, lactose and maltose); sugar acids (e.g., gluconic or glucoheptanoic acid); other polyhydric alcohols such as sorbitol and manitol; and the like. Of such chelating agents, the polyaminocarboxylic acids, particlarly ethylene-diamintetraacetic acid (EDTA), N-hydroxyethylethylene-diaminetriacetic acid and nitrilotriacetic acid are most advantageously employed.

Most preferably, the metal chelate is the chelate of a ferrous ion with ethylenediaminetetraacetic acid, N-hydroxyethylethylenediaminetriacetic acid, or nitrilotriacetic acid.

The metal chelate is typically present in the absorbent solution at a metal ion concentration greater than about 100 ppm with a chelating agent to metal ion molecular ratio of greater than or equal to one. The metal chelate is preferably present at a metal ion concentration of about 1,000 to about 10,000 ppm and a chelating agent to metal ion molecular ratio between 1 and 10. The optimum amounts depend on the chelating agent used with a ratio of from 1 to 1.2 being preferred for the polyaminocarboxylic acids and a ratio of from 1 to 4 being preferred for the nitrilotriacetic acid.

Chelates absorb NO, i.e act as stoichiometric reactant to increase the solubility of NO in aqueous solution, in the presence of sulfite and/or bisulfite ions, collectively referred to herein as "sulfites." Such ions react with the NO-chelate complex to form iminodisulfonate salts and free the chelate for NO absorption. Examples of suitable soluble sulfite salts include sodium, potassium, lithium, magnesium and ammonium sulfite and/or bisulfite. The concentration of sulfites generally effective, with the chelate, to absorb NO depends upon the absorption rate of the chelate and the concentration of $SO_2$ in the feed gas. Since $SO_2$ in aqueous solution forms sulfurous acid, the concentration of sulfites in the absorbent is generally sufficient without replenishment, but sulfites may be added, if necessary, to maintain a concentration of at least 0.05 to about 1 g-moles/l absorbent, preferably at least about 0.1 g-moles/l.

The $SO_2$ absorbent preferably comprises a 5 to 7 member, substituted or unsubstituted nitrogen-containing heterocyclic ring compound. Piperazinone and compounds are particularly preferred. Sulfur dioxide scrubbing with aqueous piperazinone compounds, is known in the art, and is described, for example, in U. S. Pat. Nos. 4,530,704 to Jones et al. and 4,783,327 to Treybig et al., both of which are incorporated herein by reference. Briefly, the piperazinone absorbents absorb nearly all of the $SO_2$ from the $SO_2$-containing gas in the absorption step, and tests have shown 60 to 79 percent of the absorbed $SO_2$ is thermally stripped with steam from representative absorbents in the stripping step.

Suitable piperazinone compounds have the general formula:

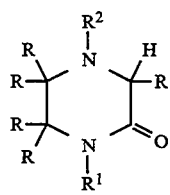

wherein R is hydrogen, an alkyl group having one to six carbon atoms or aryl or aralkyl group having from six to twelve carbon atoms; $R^1$ is hydrogen, an alkyl or hydroxyalkyl group having from one to six carbon atoms, or an aryl or aralkyl group having from six to twelve carbon atoms; and $R^2$ is $R^1$ or preferably a 2-hydroxyethyl group of the formula:

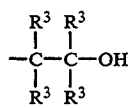

wherein $R^3$ is hydrogen or an alkyl group having one or two carbon atoms. Suitable 4-(2-hydroxyalkyl)-2-piperazinones include 4-(2-hydroxyethyl)-2-piperazinone (4-HEPN), 4-(2-hydroxyethyl)-1-methyl-2-piperazinone, 4-2(2-hydroxyethyl)-3-methyl-2-piperazinone, 4-(2-hydroxyethyl)-5-methyl-2-piperazinone, 3-ethyl-4-(2-hydroxyethyl)-2-piperazinone, 3-ethyl-4-(2-hydroxyethyl)-2-piperazinone, 6-ethyl-4-(2-hydroxyethyl)-2-piperazinone, 4-(2-hydroxyethyl)-5,6-dimethyl-2-piperazinone, 1-ethyl-4-(2-hydroxyethyl)-2-piperazinone, 4-(2-hydroxyethyl)-3-phenyl-2-piperazinone, 1,4-bis(2-hydroxyethyl)-2-piperazinone, 4-(2-hydroxyethyl)-2-piperazinone, 4-(2-hydroxypropyl)-2-piperazinone, 4-(2-hydroxybutyl)-2-piperazinone and 4-(2-hydroxypropyl)-6-methyl-2-piperazinone.

Preparation of the 4-HEPN compounds useful in the invention is accomplished by reacting the appropriate 2-piperazinone or substituted derivative thereof with ethylene oxide or ethylene chlorohydrin. An improved method of preparation involves the reaction of an N-hydroxyalkylalkylenediamine with glyoxal or a substituted glyoxal. Details of this process are disclosed in the previously mentioned Treybig et al. patent.

An advantage of the heterocyclic nitrogen-containing $SO_2$ sorbents is a relatively high boiling point of these compounds. High boiling point is a desirable property for reducing sorbent losses during the $SO_2$ desorbing step. At atmospheric pressure, 4-HEPN, for example, boils at 400° C. High boiling points are thought to result from these $SO_2$ absorbent compounds dimerizing at elevated temperatures.

The scrubbing amines are generally employed in sulfur dioxide scrubbing solutions at a concentration of from about 0.1 molar up to their saturation concentration in water.

The absorbent solution of the present invention is useful for abating NO and $SO_2$ pollution gases which are a byproduct of combustion of fuels such as coal from flue gas streams. The process of the present invention may be employed on a gas stream wherein the $SO_2$ concentration of the stream may vary from about 10 ppm up to about 45 percent by volume or more and the NO concentration of the stream may vary from about 1 ppm to about 15,000 ppm by volume or more.

A fluid stream such as a flue gas is scrubbed with the absorbent solution in a contacting apparatus such as for example, a column or other conventional equipment for this purpose.

$SO_2$ absorption by an amine absorbent, such as 4-(2-hydroxyethyl)-2-piperazinone (4-HEPN), which is referred to hereafter for the purposes of illustration and clarity, and not limitation generally proceeds by the following reaction series:

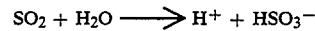

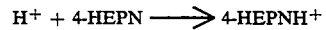

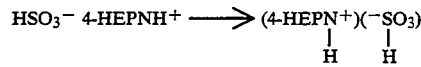

However, the following representative byproduct reactions (among others) can also occur resulting in heat stable salt (HSS) formation:

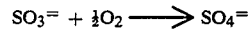

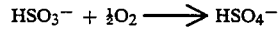

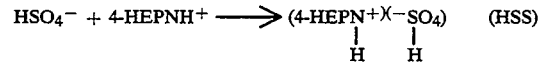

Simultaneous NO absorption in the present invention is thought to proceed by the following reactions:

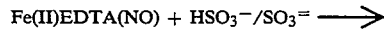

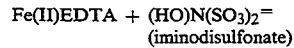

As a byproduct reaction, the chelate becomes oxidized by the reaction:

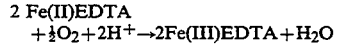

to produce a ferric chelate species unreactive to NO. Consequently, the spent chelate must be reduced to regenerate the chelate component for NO absorption. Oxidized metal chelates of the present invention may be reduced chemically, for example, with sulfite, optionally with or without accelerators or reduction enhancing additives, but are preferably reduced and regenerated at the cathode of an electrochemical cell.

The absorber column in the present process may be operated at a temperature of from about 0° to about 120° C., but is preferably operated at a temperature of from about 5° to about 95° C.

In the process, both absorber and stripper are typically operated at a pressure of from about atmospheric (e.g. 0 to about 69 Pa gauge) to about 10 atmospheres, however, atmospheric pressure is preferred for the convenience of lower equipment and operating costs and reduced $SO_2$ absorbent losses. Higher temperatures and pressures are not deleterious so long as they are below the decomposition temperature of the absorbent.

The absorber column is preferably maintained at a pH between about 3 and about 8 to retain NO absorbance in the absorber.

The absorbed $SO_2$ may be thermally stripped and the 4-HEPN regenerated for $SO_2$ absorption by passing steam through the spent absorbent solution in a stripping column. Thermal regeneration of the absorbent takes place at any temperature below the thermal decomposition of the amine absorbent, preferably at a temperature of from about 75° C. to about 150° C. most preferably of from about 90° C. to about 120° C. Regeneration at about 100° C. (0 to 69 Pa gauge) is particularly convenient because water in the absorbent solution boils and can be refluxed while the $SO_2$ released. $SO_2$ is recovered as an essentially pure gas. The desorbing step may be represented as:

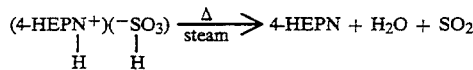

The lean-$SO_2$ absorbent is recycled to the absorbent column but preferably though an electrochemical cell for further absorbent regeneration.

Electrochemical cells utilized in the present invention, may have varying arrangements of electrode, compartments and membranes as is known in the art for operating a reduction-oxidation cell. A simple two compartment cell is preferred for lower equipment costs including membrane area and operating costs.

As mentioned previously, the membrane preferably divides the cell into anode and cathode compartments wherein the catholyte comprises absorbent solution containing oxidized inactive metal chelates, heat stable amine salts and other soluble byproduct salts such as iminodisulfonate. The anolyte preferably comprises an aqueous electrolytic solution such as dilute sulfuric acid, aqueous solutions of alkali metal salts, and the like.

The cell electrodes may be comprised of materials commonly employed therein including anode materials such as graphite, steel, nickel, lead, titanium, tantalum, and the like. Anode materials may also comprise metals coated, for example, with metallic iridium, palladium and platinum, and the like or oxides thereof. Cathode materials generally comprise graphite, steel, nickel, lead and the like.

The cell membrane may be ionic including bipolar, or non-ionic as is known in the art, however, anionic membranes are preferred. An advantage to using an anionic exchange membrane is the conversion of heat stable salts back to the usable free state and separation of other waste byproduct salt anions from the absorbent in addition to the chelate-reducing action of the cell. Heat stable salts in excessive concentration tie up amine sorbent and other waste salt byproducts may interfere with NO absorption. HSS anions and other byproduct salt anions may only diffuse from the catholyte through the anion membrane into the anolyte for eventual disposal when the anolyte electrolyte is refreshed. Anion transport into the anode compartment is driven by electrical potential and concentration gradients in the cell.

Representative examples of suitable anion exchange membranes include the anion exchange membranes fabricated from quaternized functionalized polymers such as aminated polystyrene, which are sold under the trade names IONICS by Ionics, Inc. or IONAC by Sybron, Inc. Other suitable anion exchange membranes comprise radiation grafted and/or crosslinked polyethylene and polytetrafluoroethylene films sold by RAI Research Corp. under the trade designation RAIPORE including R-1030 and R-5030.

Several reactions occur in the electrochemical cell. At the anode, water is oxidized into oxygen and hydrogen ions

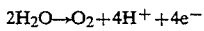

Other reactions in the anode compartment reactions typically include:

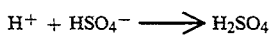

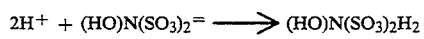

At the cathode, electrons supplied by an outside power source reduce ferric chelates:

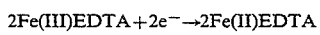

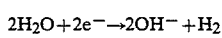

In the cathode compartment, HSS cations are neutralized to free amine by hydroxide ions produced in situ:

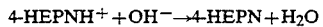

A simple two-compartment cell separated by an anion exchange membrane is a preferred configuration of the electrochemical cell. However, other suitable cell configurations and membranes are possible, such as, for example, a plurality of anode and cathode compartments having a plurality of anion and cation exchange membranes alternately disposed between the electrodes; or a plurality of anode and cathode compartments separated by a plurality of anion and/or cation and/or bipolar exchange membranes alternately disposed between the electrodes.

The heat stable salts may alternately or additionally be periodically purged from the absorbent solution by blowdown of the absorbent stream and addition of fresh absorbant.

To maintain the absorber column pH between about 3 to about 8, a portion of the $SO_2$ taken from the stripper column may be added to the recycle absorbent solution if required. Alternatively, the incoming flue gas $SO_2$ concentration may be increased by $SO_2$ taken from the stripper.

The following examples illustrate the use of the absorbent in the present invention:

EXAMPLE 1

An aqueous solution of ferrous EDTA chelate and 4-(2-hydroxyethyl)-2-piperazinone (4-HEPN) also including sodium sulfite was tested for compatibility and abatement of NO from a test gas in a bench scale laboratory absorption column. The column was 51 cm in length, 5.1 cm ID and packed with glass helices. The apparatus included mass flow control of the test gas, NO and $SO_2$ analyzers for the vent gas and an electrochemical cell to regenerate exhausted chelate absorbent. The pH of the absorption column was monitored and the electrochemical cell operated on a closed loop aqueous electrolyte on the anode side. An anion exchange dialysis membrane obtained from RAI Technology under the trade name RAIPORE-1030 separated the anode and cathode compartments in the cell.

A 1 l solution (6.75 pH) of absorbent was prepared containing 11.97 g of 7 weight percent ferrous EDTA chelate in distilled water for a final concentration of about 800 ppm. This absorbent solution also included 63 g of $Na_2SO_3$. The absorbent was circulated through the top of the absorption column in a loop including the cathode compartment of the electrochemical cell at a rate of 300 ml/min. A calibrated feed gas containing 210 ppm NO, 5% by volume $O_2$ and the balance nitrogen was introduced to the bottom of the column in countercurrent flow at a rate of 13 standard cubic feet per hour (SCFH). The vent gas had 67 ppm NO for approximately 68% abatement. Next, 350 ml of 40 weight percent of 4-HEPN solution in water was slowly added into the circulating absorbent. The final absorbent concentration was about 10 weight percent of 4-HEPN. An absence of any precipitate indicated compatibility of the 4-HEPN to the other absorbent components. After addition of the 4-HEPN, the pH of the combined solution increased to 7.51 and the vent concentration of NO was 75 ppm (64% abatement).

EXAMPLE 2

An absorbent solution containing ferrous EDTA chelate, sodium sulfite and 4-(2-hydroxyethyl)-2-piperazinone was prepared the same as in Example 1 except that 375 ml of the 4-HEPN solution was utilized instead of 350 ml. The apparatus and calibrated gas composition and flow rate was also the same as described in Example 1 except that 1000 ppm $SO_2$ was added to the test gas. Analysis showed that the vent gas contained 61 ppm NO (72% abatement) and <20 ppm $SO_2$ (>98% abatement). The spent 4-HEPN-containing solution can be regenerated for $SO_2$ absorption by thermal stripping with steam and a major portion of the absorbed $SO_2$ can be recovered.

The foregoing description of the invention is illustrative and explanatory thereof. Various changes in the materials, apparatus, and particular parts employed will occur to those skilled in the art. It is intended that all such variations within the scope and spirit of the appended claims be embraced thereby.

What is claimed is:

1. A process for abating nitric oxide and sulfur dioxide from a flue gas, comprising the steps of:
   (a) contacting flue gas with an aqueous absorbent solution, in an absorption stream comprising a reduced metal chelate and sulfites to absorb nitric oxide from said flue gas, and a piperazinone $SO_2$ absorbent of the formula:

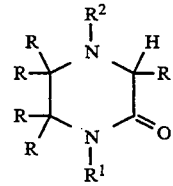

wherein R is hydrogen, an alkyl group having one to six carbon atoms or aryl or aralkyl group having from six to twelve carbon atoms, $R^1$ is hydrogen, an alkyl or hydroxyalkyl group having from one to six carbon atoms, or an aryl or aralkyl group having from six to twelve carbon atoms, and $R^2$ is $R^1$ or a 2-hydroxyethyl group of the formula:

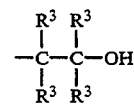

wherein $R^3$ is hydrogen or an alkyl group having one or two carbon atoms to reversibly absorb sulfur dioxide from said flue gas, at a pH between 3 and 8 effective to maintain compatibility between the chelate, sulfites and $SO_2$ absorbent to form an $SO_2$-rich absorbent solution containing oxidized metal chelate and heat stable piperazinone salts;
   (b) thermally stripping a major portion of the sulfur dioxide from said $SO_2$-rich absorbent solution to obtain an $SO_2$-lean absorbent solution containing only a minor portion of the $SO_2$ absorbed in step (a);
   (c) passing said $SO_2$-lean absorbent solution through an electrochemical cell to reduce said oxidized metal chelates, and to convert the heat stable piperazinone salts into free piperazinone $SO_2$ absorbent, to regenerate said absorbent solution; and
   (d) recycling said regenerated absorbent solution to said contacting step.

2. The process of claim 1, wherein said electrochemical cell comprises a two compartment cell having an anode in an anode compartment separated by an anionic membrane from a cathode in a cathode compartment, said $SO_2$-lean absorbent solution is directed to said cathode compartment and wherein an electrical potential is imposed across said anode and said cathode to reduce said oxidized metal chelates in said cathode compartment, and to separate heat stable salt anions from the cathode compartment through the anionic membrane into the anode compartment, to obtain the regenerated absorbent solution.

3. The process of claim 1, wherein absorbent temperature is in a range of from about 5° C. to about 95° C. in contact with said flue gas.

4. The process of claim 1, wherein said metal chelate comprises metal complexed with a chelating agent selected from the group consisting of ethylenediaminetetracetic acid, N-hydroxyethylethylenediaminetriacetic acid and nitrilotriacetic acid.

5. The process of claim 1, wherein said metal chelate is selected from the group consisting of iron, nickel and copper chelates.

6. The process of claim 1, wherein said absorbent solution in step (a) comprises from about 1000 to about 10,000 parts per million of said metal chelate.

7. The process of claim 1, wherein said sulfites are selected from the group consisting of sulfites and bisulfites of sodium, potassium, lithium, magnesium and ammonium.

8. The process of claim 1, wherein said sulfites comprise at least about 0.05 g moles per liter of said absorbent solution in step (a).

9. The process of claim 1, wherein said $SO_2$ absorbent comprises at least about 0.1 g moles per liter of said absorbent solution in said contacting step.

10. The process of claim 1, wherein steps (a) and (b) operating pressure is in a range of from ambient to about 10 atmospheres.

11. The process of claim 1, wherein step (b) includes recovering essentially pure sulfur dioxide.

12. The process of claim 2, further comprising circulating an aqueous electrolyte solution through said anode compartment.

13. The process of claim 1, wherein said $SO_2$ absorbent comprises a piperazinone selected from the group consisting of
4-(2-hydroxyethyl)-2-piperazinone,
4-(2-hydroxyethyl)-1-methyl-2-piperazinone,
4-(2-hydroxyethyl)-3-methyl-2-piperazinone,
4-(2-hydroxyethyl)-5-methyl-2-piperazinone,
3-ethyl-4-(2-hydroxyethyl)-2-piperazinone,
6-ethyl-4-(2-hydroxyethyl)-2-piperazinone,
4-(2-hydroxyethyl)-5,6-dimethyl-2-piperazinone,
1-ethyl-4-(2-hydroxyethyl)-2-piperazinone,
4-(2-hydroxyethyl)-3-phenyl-2-piperazinone,
1,4-bis-(2-hydroxyethyl)-2-piperazinone,
4-(2-hydroxyethyl)-2-piperazinone,
4-(2-hydroxypropyl)-2-piperazinone,
4-(2-hydroxybutyl)-2-piperazinone and
4-(2-hydroxy-propyl)-6-methyl-2-piperazinone.

14. The process of claim 1, wherein said $SO_2$ absorbent comprises 4-(2-hydroxyethyl)-2-piperazinone.

15. The process of claim 1, wherein $R^2$ is selected from said 2-hydroxyethyl groups.

16. The process of claim 2, including the steps of supplying said $SO_2$-lean absorbent solution to said contacting step and passing a side-stream of said $SO_2$-lean absorbent solution through said electrochemical cell.

* * * * *